(12) United States Patent
Kennedy et al.

(10) Patent No.: US 7,574,310 B2
(45) Date of Patent: Aug. 11, 2009

(54) NETWORK-ENABLED ELECTRICAL POWER DISTRIBUTION EQUIPMENT WITH IMPROVED STORAGE SYSTEM

(76) Inventors: Robert A. Kennedy, 2237 Oak Leigh Dr., Murfreesboro, TN (US) 37129; Michael W. Pyle, 316 Southwinds Dr., Hermitage, TN (US) 37076; James F. Clark, 506 Richard Rd., Murfreesboro, TN (US) 37129

( * ) Notice: Subject to any disclaimer, the term of this patent is extended or adjusted under 35 U.S.C. 154(b) by 184 days.

(21) Appl. No.: 11/451,166

(22) Filed: Jun. 12, 2006

(65) Prior Publication Data

US 2007/0288592 A1 Dec. 13, 2007

(51) Int. Cl.
*G06F 15/16* (2006.01)

(52) U.S. Cl. .................. 702/61; 709/224; 709/226; 700/286; 700/292

(58) Field of Classification Search ............ 702/61; 709/217, 224, 226; 700/204, 286, 292
See application file for complete search history.

(56) References Cited

U.S. PATENT DOCUMENTS

| | | | |
|---|---|---|---|
| 5,796,347 A * | 8/1998 | Zulaski | 340/635 |
| 6,522,247 B2 * | 2/2003 | Maruyama et al. | 340/506 |
| 6,530,065 B1 * | 3/2003 | McDonald et al. | 716/4 |
| 6,826,580 B2 | 11/2004 | Harris et al. | |
| 6,944,555 B2 | 9/2005 | Blackett et al. | |
| 6,968,440 B2 | 11/2005 | Brueggen | |
| 7,103,453 B2 * | 9/2006 | Deck et al. | 700/292 |
| 2001/0048375 A1 * | 12/2001 | Maruyama et al. | 340/870.11 |
| 2005/0033803 A1 | 2/2005 | Vleet et al. | |
| 2005/0038717 A1 | 2/2005 | McQueen, III et al. | |
| 2005/0160094 A1 | 7/2005 | Morgenstern et al. | |
| 2005/0234864 A1 | 10/2005 | Shapiro | |
| 2006/0294224 A1 * | 12/2006 | Wilson et al. | 709/224 |
| 2007/0038749 A1 * | 2/2007 | Noya et al. | 709/226 |
| 2007/0156291 A1 * | 7/2007 | Curt et al. | 700/286 |

* cited by examiner

*Primary Examiner*—Carol S Tsai (57) ABSTRACT

Network-enabled electrical power distribution equipment comprises at least one networked intelligent device coupled to a power distribution system and measuring and storing at least one sensed condition in the power distribution system; a server for storing and retrieving data relating to the sensed condition and the power distribution equipment; local storage coupled to the server; remote network storage accessible to the server via the network containing that server; and a program operating on the server for controlling the storing of data in, and the retrieval of data from, the local and remote network storages.

20 Claims, 6 Drawing Sheets

NETWORK-ENABLED ELECTRICAL POWER DISTRIBUTION EQUIPMENT WITH IMPROVED STORAGE SYSTEM

FIELD OF THE INVENTION

This invention is directed generally to network-enabled electrical power distribution equipment, such as switchgear, switchboards, panelboards, motor control centers, control panels and the like. The invention particularly relates to such power equipment having an improved storage system.

BACKGROUND OF THE INVENTION

Microprocessor-based electrical power distribution equipment such as switchgear, switchboards, panelboards, motor control centers accumulate considerable amounts of information concerning the electrical distribution systems to which they are connected, as well as the equipment itself. The amount of such information generally increases over the operating life of the equipment, not only because of the retention of required historical information but also because of the increasingly complex functions being performed by such equipment. In addition, such equipment often uses email messages to notify users of various changes that occur in the conditions being monitored, and such emails messages are also stored in the equipment for prolonged periods. Consequently, the storage capacity required in such equipment escalates steadily with time.

SUMMARY OF THE INVENTION

In one embodiment of the present invention, network-enabled electrical power distribution equipment comprises at least one networked intelligent device coupled to a power distribution system and measuring and storing at least one sensed condition in the power distribution system; a server for storing and retrieving data relating to the sensed condition and the equipment; local storage coupled to the server; remote network storage accessible to the server via the network containing the intelligent device; and a program operating on the server for controlling the storing of data in, and the retrieval of data from, the local and remote network storages.

Another aspect of the invention provides a method of storing data from a networked intelligent device coupled to a power distribution system and measuring and storing at least one sensed condition in the power distribution system, by storing documents that can be accessed by browsers and that include documents containing data relating to the sensed condition and the intelligent device, in both local storage coupled to that device, and in remote network storage accessible to the device via the network containing the device.

BRIEF DESCRIPTION OF THE DRAWINGS

The invention may best be understood by reference to the following description taken in conjunction with the accompanying drawings, in which.

DETAILED DESCRIPTION OF THE ILLUSTRATED EMBODIMENT

Although the invention will be described in connection with certain preferred embodiments, it will be understood that the invention is not limited to those particular embodiments. On the contrary, the invention is intended to include all alternatives, modifications and equivalent arrangements as may be included within the spirit and scope of the invention as defined by the appended claims.

Figure 1:
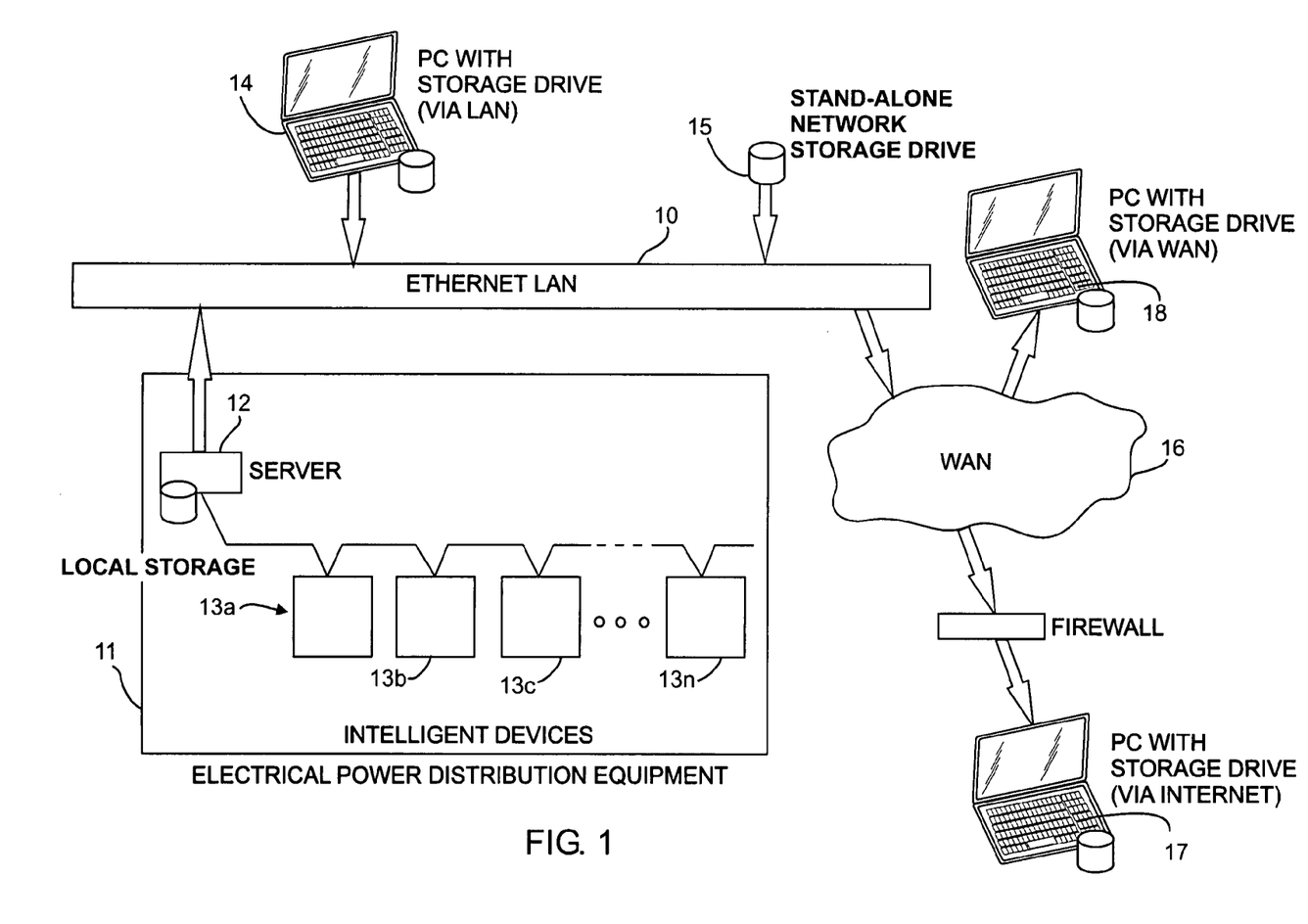
FIG. 1 is a diagrammatic illustration of a network-enabled power equipment that includes a server and intelligent devices (devices with data communications capability)

Referring now to the drawings, and initially to FIG. 1, a network 10 includes electrical power distribution equipment 11 that includes a server 12 and multiple intelligent devices 13a-13n, one or more personal computers or workstations 14 that include storage drives, and a stand-alone network storage drive 15. The network 10 is an Ethernet network or some other form of private LAN, which is typically coupled to a WAN 16 that can include additional personal computers or work stations 17 and 18 containing storage drives.

The server 12 can be programmed to operate as a web server that stores web pages, i.e., HTML (hypertext markup language) pages or files, that can be retrieved by a web browser. Each web server has a unique IP address and possibly a domain name, and serves up web pages when addressed by a web browser.

The server 12 provides gateway functions by allowing Ethernet access to the multiple intelligent devices 13a-13n. When functioning as a web server, the server 12 also allows access to custom HTML pages via standard web browsers. These HTML pages may display information from the web server host and/or the intelligent devices 13a-13n.

The server 12 preferably has one or more on-board Ethernet ports, e.g., one for a 10/100Base TX Twisted Pair connection and another for a 100Base Fx connection, and also has an RS-485 serial port for coupling to the intelligent devices 13a-13n. The RS-485 port typically supports multiple devices without a repeater.

The server 12 also operates a storage management system that controls the distribution of data storage among the local storage associated with the server 12 and the various remote network storages coupled to the network, such as the stand-alone storage drive 15 and the storage drives associated with the personal computers or work stations 14, 17 and 18. The storage management system resides onboard the server 12 integrated into the power distribution equipment 11, one example of which is the EGX 400 "PowerLogic Ethernet Gateway available from Schneider Electric in Palatine, Ill. The server 12 is responsible for collecting, storing and distributing both user-entered data and automatically generated data, which may served to the user via the server's HMI (human-machine interface), using the HTTP protocol.

Web servers have been embedded in electrical power equipment to organize data relating to the equipment itself as well as the characteristics of the power flowing through the equipment. The web servers store equipment data and also log data relating to the electrical power flowing through the equipment. As this data is accumulated, the need for more memory escalates steadily. This escalation of the need for more memory is compounded as the power equipment itself, and the functions it performs, become increasingly complex.

Information relating to the electrical power equipment itself includes a variety of technical documentation such as "as-built" drawings, elevation views, one-line diagrams, wiring schematics and component instruction manuals. Information relating to the electrical power flowing through the equipment includes logged measurements, breaker operations, alarms/events and abnormal current and voltage waveforms, all of which are memory-intensive storage operations, especially as the log intervals are reduced to provide more details about monitored events.

The web server includes the usual types of memory, namely, CPU registers inside the CPU, CPU caches (e.g., static RAM) inside and/or adjacent the CPU, main memory (e.g., DRAM), and disk storage. CPU caches and main memory are often referred to collectively as "physical memory" or "primary storage." Disk storage is often referred to as "secondary storage." When the maximum size of the primary storage is less than that required to run the desired programs (including both code and data), a virtual memory manager (VMM) causes some of the information to be kept in the secondary storage and swapped with information in the primary storage as needed. Virtual memory uses hardware within the computer to translate the address of a memory location generated by the software (the "virtual memory address") into either (1) the address of a real memory location (the "physical memory address") assigned within the physical memory to store that memory item, or (2) an indication that the desired memory item is not currently stored in the main memory (a "virtual memory exception" or "page fault"), which invokes the operating system to handle the situation. The result is to swap sections of information between the primary storage and the secondary storage, such as the hard disk.

To accommodate the storage of large amounts of information that exceed the capacity of the physical memory available in the web server and the equipment in which the server is embedded, the web server is programmed to store and retrieve selected information to and from the various remote network storage devices. The web server identifies the remote network storage locations using either remote network document locations or remote network storage locations.

The web server can access remote network storage devices as easily as its own local storage. A setup mechanism is provided so the user can designate whether the data is to be stored locally (in the web server itself) or in a remote network storage device (e.g., a PC hard drive or other storage device across a workgroup, domain, intranet server or an external Web site). The functionality of the equipment is expanded by facilitating access to reference documents and historical data, without being constrained by the memory available in the web server alone.

If two web servers access the same network storage device/address/name, there are two scenarios to consider. In a first scenario, the data being saved or accessed is a reference document or otherwise "static" data or documentation not generated by the web server itself. If the document/data is being opened to be viewed or read only, any number of servers can access the document on the network storage device simultaneously. If the document is being saved to the web server, regardless of whether the web server will in turn store it locally or remotely on the network storage device (from a virtual standpoint it is the same), and the document/data file already exists, the user can be asked if the existing document is to be overwritten, or the web server can automatically overwrite the existing document without prompting.

In a second scenario, the data being saved or accessed is generated by the web server itself, e.g., historical data gathered from itself or other devices. If the data is being opened to be viewed or read only, any number of servers can access the document on the network storage device simultaneously. If the web server is saving data that it generates, that data is "owned" by that web server, and other devices can only access it in a read only mode. When saving the data or file, the web server either appends new data to or otherwise updates an existing file, or generates a new file if one did not exist. Each web server follows an a priori naming convention and/or a unique storage location convention that associates a data/file(s) to each particular web server.

If a remote network document location is utilized, the web server is configured with the root location of the documents stored on the network, for example: \\<network address/name>\<folder name 1>\<folder name 2>\ . . . \<folder name N>, where <network address/name> may be either a device name or an actual network address, such as an Internet Protocol (IP) address. The device may be a network server, a PC with a shared local drive, or any of a number of other types of network storage devices. The web server then dynamically builds a document-links web page using one of several possible methods, which include but are not limited to the following:

(1) A priori rules are established defining the naming conventions and locations (sub folders) of documents. These rules are then programmed into the web server which follows these rules to dynamically create a web page (or pages) with organized links to the documents. The rules are also followed when naming and placing the documents at the specified root location.

(2) A document association file with a predefined name is placed in the specified root location. This file contains all of the information pertaining to the locations of the documents and information required to associate and organize the documents with the particular electrical power equipment to which the web server is applied. The format and syntax of the file may be, but is not limited to, XML, Excel, CSV or TXT. The web server accesses this file over the network and uses the information in the file to dynamically build web page(s) with the links to the documents.

(3) Method (a) or (b) described above, but using pre-written web pages with static links to the documents which are then dynamically redirected to the virtual storage locations of the documents, rather than having the web server dynamically build the document links page.

If a remote network storage location is utilized for log file data, the web server is configured with the root location to be used for storing the log file data on the network, for example: \\<network address>\<folder name 1>\<folder name 2>\ . . . \<folder name N>, where <network address> may be either a device name or an actual network address, such as an Internet Protocol address. The device may be a network server, a PC with a shared local drive, or any of a number of other types of network storage devices. The web server then maps the remote location in order to utilize the location for the log file data using one of several methods, such as mapping the remote location to appear as a local location on the web server.

In any network, it is possible to lose the communication path between any two devices. In order to provide a more robust solution for utilizing the remote location for log file data under these circumstances, the web server may set aside a local location to be utilized for short term storage of the log file data during periods when the remote location cannot be accessed. When loss of communications to the remote location occurs, the web server will log data to the local storage; once communication with the remote location is re-established, the web server will transfer all of the log file data collected locally to the log file at the remote location and clear the local log file. At this point, logging of data to the remote location will resume. Likewise, this two-step mechanism may be preferred simply to enhance performance of the system. Time-critical logging of data at short intervals can be accomplished asynchronously to the archival process to remote storage.

Figure 2A:
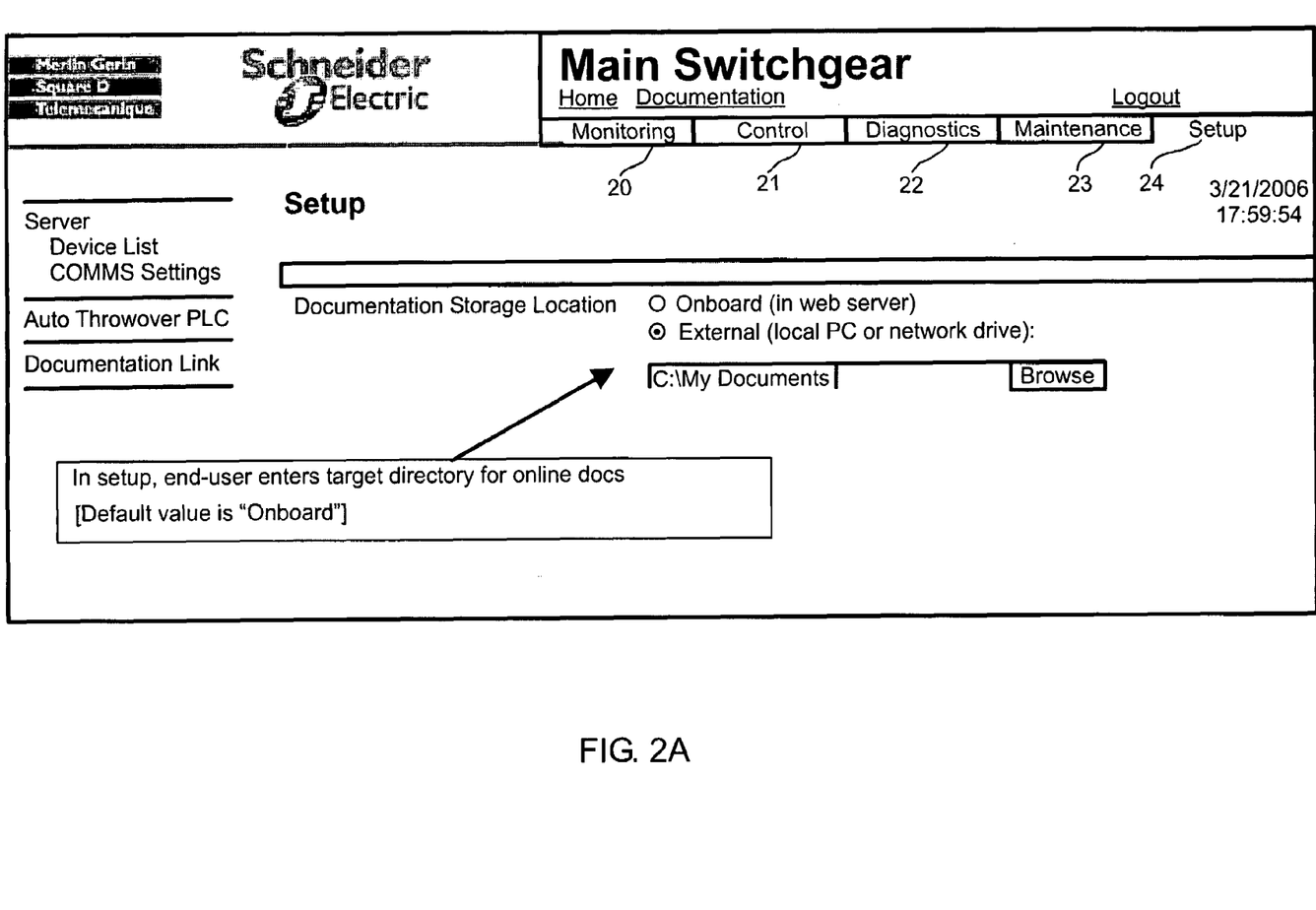
FIGS. 2a, 2b and 2c are screen shots illustrating the successive steps involved in setting up and utilizing both local and remote storage locations for documents to be stored and/or accessed via the power equipment illustrated in FIG. 1.
Figure 2B:
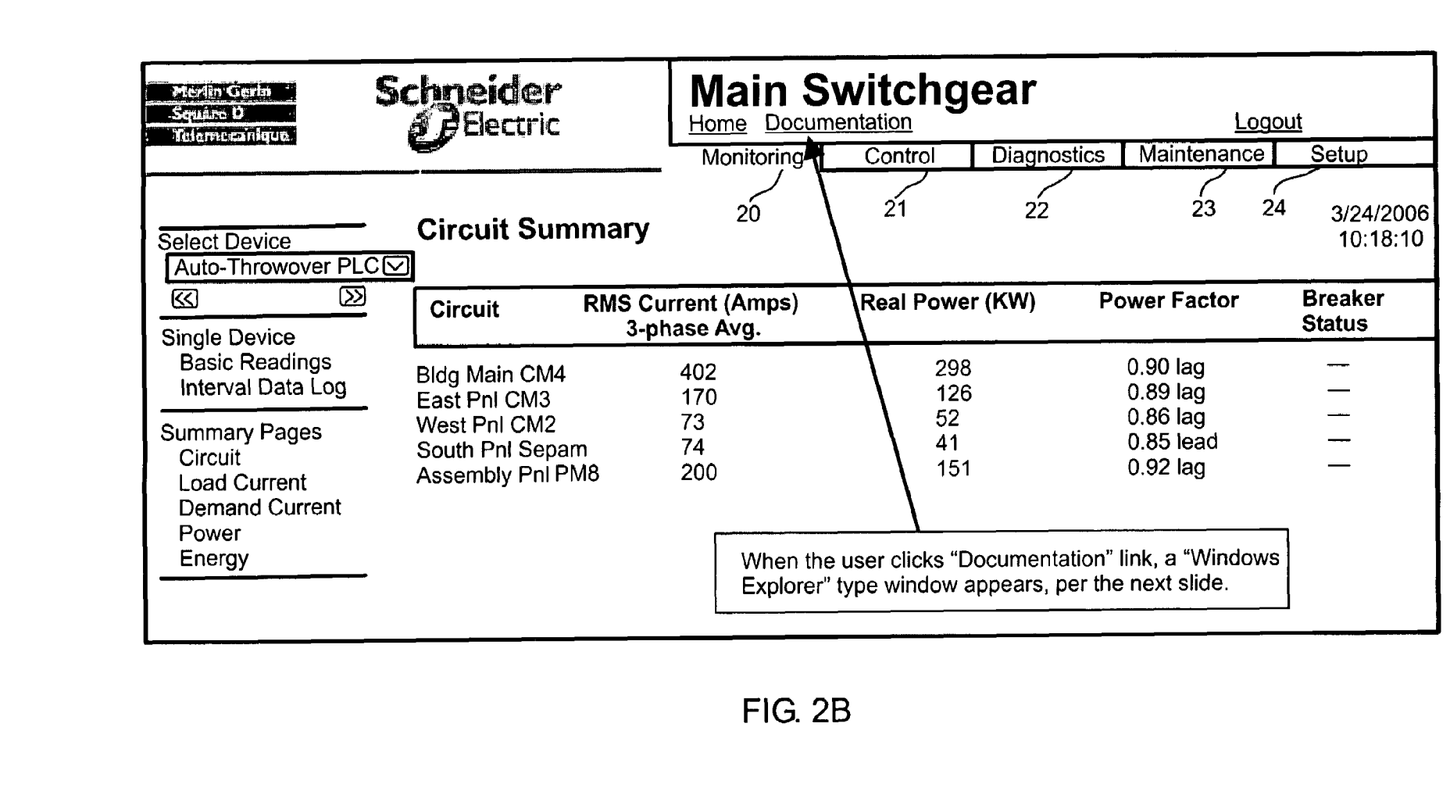
Figure 2C:
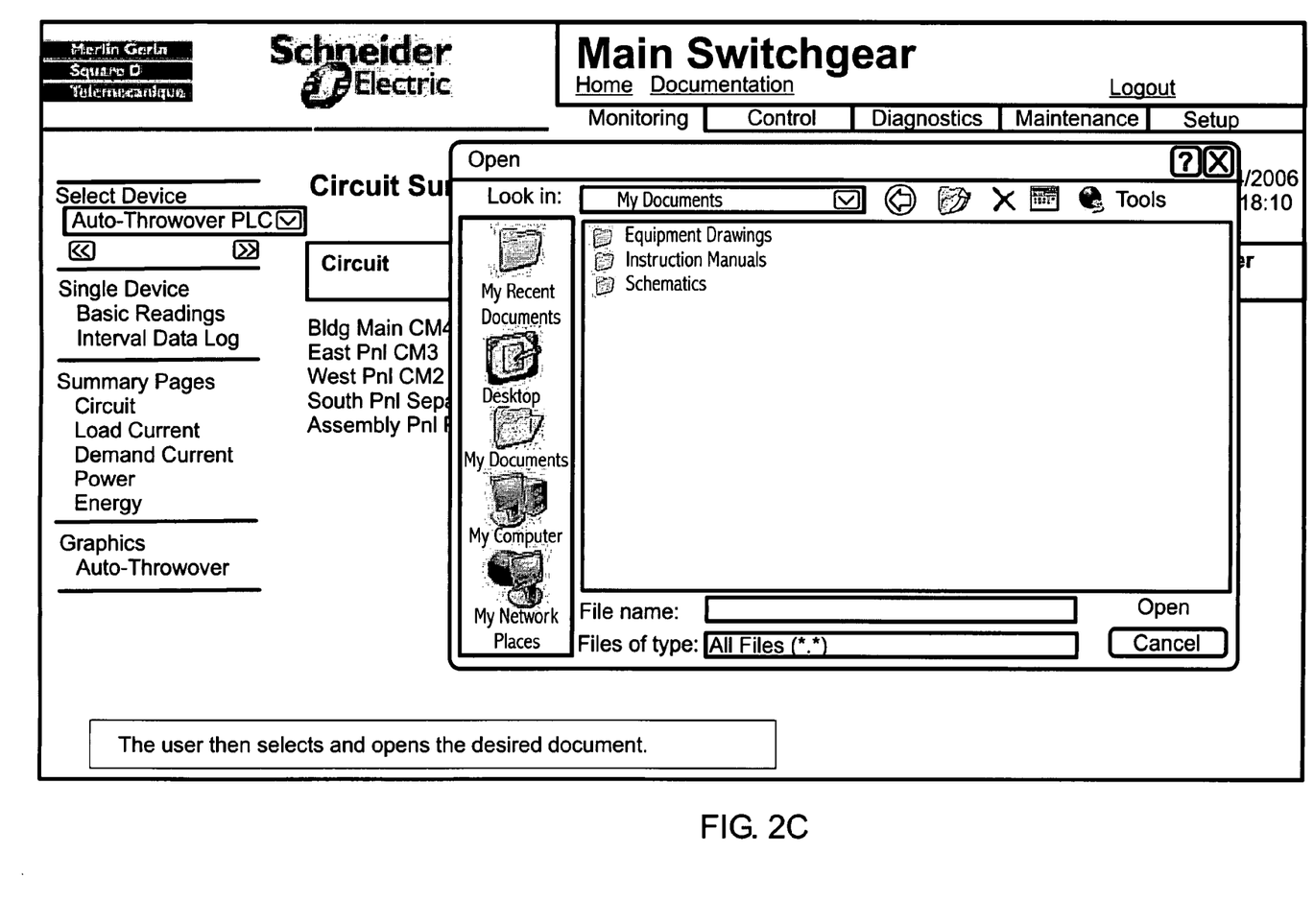

FIGS. 2a, 2b and 2c are screen shots illustrating the successive steps involved in setting up and utilizing both local and remote storage locations for documents to be stored and/or accessed via the power equipment. After a user logs on to the control management system through a web browser, the displayed web page may present the user with a series of tabs such as the five tabs 20-24 illustrated in the screen shot shown in FIG. 2a. In this example, the tabs 20-24 are "Monitoring," "Control," Diagnostics," "Maintenance" and "Setup," and the user has selected "Setup." During setup, the user selects the storage location for documents to be accessed or stored. In the example illustrated in FIG. 2a, the user can select either an "Onboard" or an "External" storage location. "Onboard" designates a storage location in the web server in the local power equipment and is typically the default setting, while "External" designates a local PC or network drive.

In the example illustrated in FIG. 2a, the user has selected the "External" storage location. The default location is the "Onboard" location, but since this storage area typically has limited capacity, most users will prefer to select an "External" location, such as a local PC hard drive, a network drive or an Internet server. The user defines the path to the specified server, which in the example of FIG. 2a is "c:\MyDocuments." This data identifying the target directory for online documents, is stored in processor memory or in a text file in non-volatile storage. The specified storage location is later used by the local server to dynamically create complete document links, including the specified location as a root address.

Although all documents are saved to a single specified location in the illustrative example, it will be understood that different documents may be saved to different storage locations. Similarly, multiple storage locations options tailored for each storage need can be supported. For example, essential documentation such as the equipment elevation views might be stored in the local server itself, extended schematics for the equipment lineup might be stored in a network server, standard instruction manuals might be accessed via the manufacturer's web site, and data logged by the server might use local storage initially for a given time period (e.g., one week or one month) and then archived to a network server for longer-term storage.

FIG. 2b illustrates a link to the stored documentation. In this example, the user has clicked on "Monitoring" and then "Documentation," which establishes a link that opens a simple file view of the documents available on the document server, as shown in FIG. 2c. In a more sophisticated example, this tree structure would be replaced by a more flexible menu structure allowing access from multiple storage locations. In either case, the specific storage location(s) are transparent to the user. (Once configured by the user during the setup step, the user is no longer required to be aware of how or where the target documents or data are stored.)

Figure 3A:
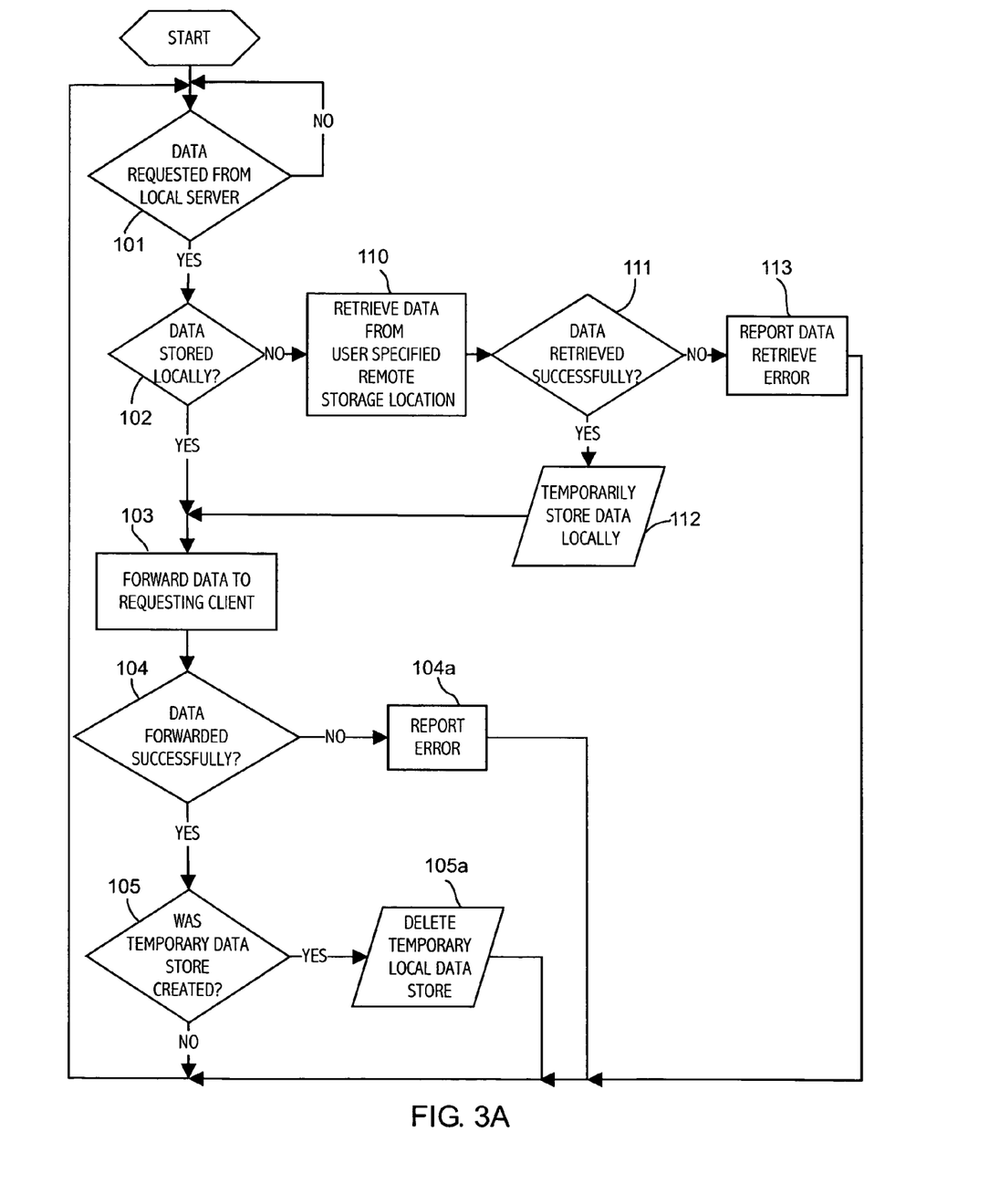
FIGS. 3a and 3b are flow charts of storage management routines executed by the power equipment illustrated in FIG. 1 to control the storing of data in the local and remote storages in the system of FIG. 1.
Figure 3B:
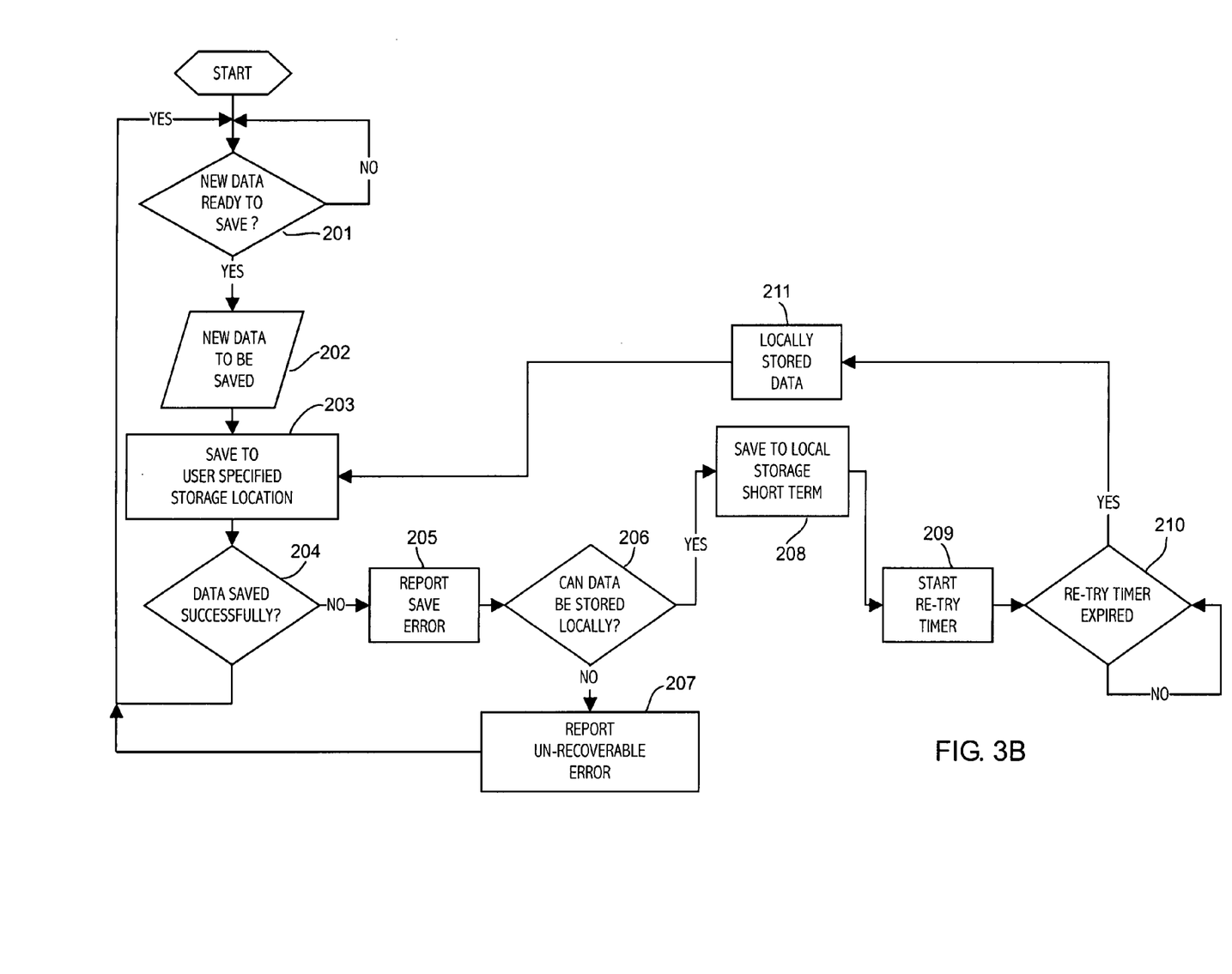

Referring to the flow charts in FIGS. 3a and 3b, when the user selects a document from the list displayed in FIG. 2c, the request for data corresponding to the selected document from the local server is detected at step 101. Step 102 then determines whether the requested data is stored locally, and if the answer is affirmative, that data is forwarded to the requesting client at step 103. Step 104 determines whether the data has been forwarded successfully, and if the answer is affirmative, the system advances to step 105 to determine whether a temporary data store has been created. A negative answer at step 104 causes an error signal to be generated at step 104a. At step 105, an affirmative answer causes the temporary local data store to be deleted at step 105a, and a negative answer ends the routine.

Returning to step 102, a negative answer indicates that the requested data is not stored locally and thus the system advances to step 110 to retrieve the data from the user-specified remote storage location. Step 111 then determines whether the data has been retrieved successfully, and if the answer is affirmative, the retrieved data is temporarily stored locally at step 112, and then forwarded to the requesting client at step 103. If step 111 determines that the data has not been retrieved successfully, an error report is generated at step 113.

A software routine for storing a new document is illustrated by the flow chart in FIG. 3b. The entry of new data corresponding to a document to be saved is detected at step 201, and the new data is temporarily stored at step 202. The new data is then saved to the user-specified storage location at step 203, and step 204 determines whether the data has been saved successfully. An affirmative answer at step 204 ends the routine. A negative answer at step 204 causes an error signal to be generated at step 205, and step 206 then determines whether the data can be stored locally. A negative answer causes an unrecoverable error report to be generated at step 207, which ends the routine. An affirmative answer at step 206 causes the data to be saved to short-term local storage at step 208, and then a re-try timer is started at step 209. Step 210 determines when the re-try timer has expired, and when the answer is affirmative, the data is locally stored at step 211 and then saved to the user-specified storage location at step 203. If the data is not successfully saved to the specified location, the local storage and re-try cycle is repeated.

While particular embodiments and applications of the present invention have been illustrated and described, it is to be understood that the invention is not limited to the precise construction and operation disclosed herein and that various modifications, changes, and variations may be apparent from the foregoing descriptions without departing from the spirit and scope of the invention as defined in the appended claims.

What is claimed is:

1. Network-enabled electrical power distribution equipment coupled to a network including a remote network storage, comprising:
   a networked intelligent device, coupled to a power distribution system, for measuring and storing at least one sensed condition in said power distribution system,
   a server for storing and retrieving data relating to said sensed condition and said system, said server being integral with said power distribution equipment,
   local storage coupled to said server, wherein the remote network storage is accessible to said server via the network, and
   a program operating on said server for controlling the storing of data in, and retrieving data from said local and remote network storages, the program treating the local and remote storages as a unitary memory.

2. The network-enabled electrical power distribution equipment of claim 1 which is at least one type selected from the group consisting of switchgear, switchboards, panelboards, control panels and motor control centers.

3. The network-enabled electrical power distribution equipment of claim 1 in which said server is programmed to identify remote network storage locations as document locations.

4. The network-enabled electrical power distribution equipment of claim 1 in which said server is a web server, and said data are web pages, drawings or data log files.

5. The network-enabled electrical power distribution equipment of claim 1 in which said network includes the Internet.

6. The network-enabled electrical power distribution equipment of claim 1, wherein said server controls said storing of data relating to said equipment in said local remote storage or in said remote storage, said network-enabled power distribution equipment including said local remote storage.

7. The network-enabled electrical power distribution equipment of claim 6, wherein data representing said at least one sensed condition is stored on said local storage and on said remote network storage, wherein time-critical data representing said at least one sensed condition is stored in said local storage until a criterion is satisfied, and, responsive to said criterion being satisfied, said networked intelligent device transferring said time-critical data stored in said local storage to said remote network storage.

8. The network-enabled electrical power distribution equipment of claim 7, wherein said criterion includes a loss of communication between said networked intelligent device and said remote network storage.

9. The network-enabled electrical power distribution equipment of claim 8, wherein said server is a web server, and said data include web pages, equipment data relating to said power distribution equipment, or log data relating to said sensed condition, and wherein said network includes the Internet.

10. The network-enabled electrical power distribution equipment of claim 9, which is a switchgear, a switchboard, a panelboard, a control panel, or a motor control center.

11. The network-enabled electrical power distribution equipment of claim 10, wherein said equipment data includes drawings, equipment elevation views, one-line diagrams, wiring schematics, schematics for equipment lineup, or instruction manuals, and wherein said log data includes logged measurements, breaker operations, alarms/events, or abnormal current or voltage waveforms.

12. A method of storing data from a networked intelligent device in power distribution equipment coupled to a power distribution system and measuring and storing at least one sensed condition in said power distribution system, comprising:
   storing documents that can be accessed by browsers and that include documents containing data relating to said sensed condition and to said device, in local storage coupled to said device, or in remote network storage accessible to said device via the network containing said device; and
   managing said documents by a server integral with the network-enabled power distribution equipment coupled to said power distribution system, the server treating the local and remote storages as a unitary memory.

13. The method of claim 12 in which said networked intelligent device is part of at least one type of power distribution equipment selected from the group consisting of switchgear, switchboards, panelboards, control panels, control panels and motor control centers.

14. The method of claim 12 in which locations in said remote network storage are identified as document locations.

15. The method of claim 12 in which said documents are web pages, drawings or data log files.

16. The method of claim 12 in which said network includes the Internet.

17. The method of claim 12, further comprising accessing said documents by said server regardless of where said documents are stored.

18. Network-enabled electrical power distribution equipment coupled to a network including a remote network storage, comprising:
   a networked intelligent device, coupled to a power distribution system, for measuring and storing at least one sensed condition in said power distribution system;
   a web server for storing and retrieving data relating to said sensed condition and said system, web pages, equipment data relating to said power distribution equipment, or log data relating to said sensed condition, said web server being integral with said power distribution equipment;
   local storage coupled to said web server, wherein the remote network storage is accessible to said web server via the network; and
   a program operating on said web server for controlling storage of said data representing said at least one sensed condition in, and retrieving said data from said local and remote network storages, the program treating the local and remote storages as a unitary memory, wherein time-critical data representing said at least one sensed condition is stored in said local storage until a criterion is satisfied, and, responsive to said criterion being satisfied, said networked intelligent device transferring said time-critical data stored in said local storage to said remote network storage.

19. The network-enabled electrical power distribution equipment of claim 18, which is a switchgear, a switchboard, a panelboard, a control panel, or a motor control center, wherein said criterion includes a loss of communication between said networked intelligent device and said remote network storage.

20. The network-enabled electrical power distribution equipment of claim 19, wherein said equipment data includes drawings, equipment elevation views, one-line diagrams, wiring schematics, schematics for equipment lineup, or instruction manuals, and wherein said log data includes logged measurements, breaker operations, alarms/events, or abnormal current or voltage waveforms.

* * * * *